C. A. LITCHFIELD.
HEADLIGHT MECHANISM FOR VEHICLES.
APPLICATION FILED AUG. 9, 1921.
1,434,218.
Patented Oct. 31, 1922.
2 SHEETS—SHEET 1.
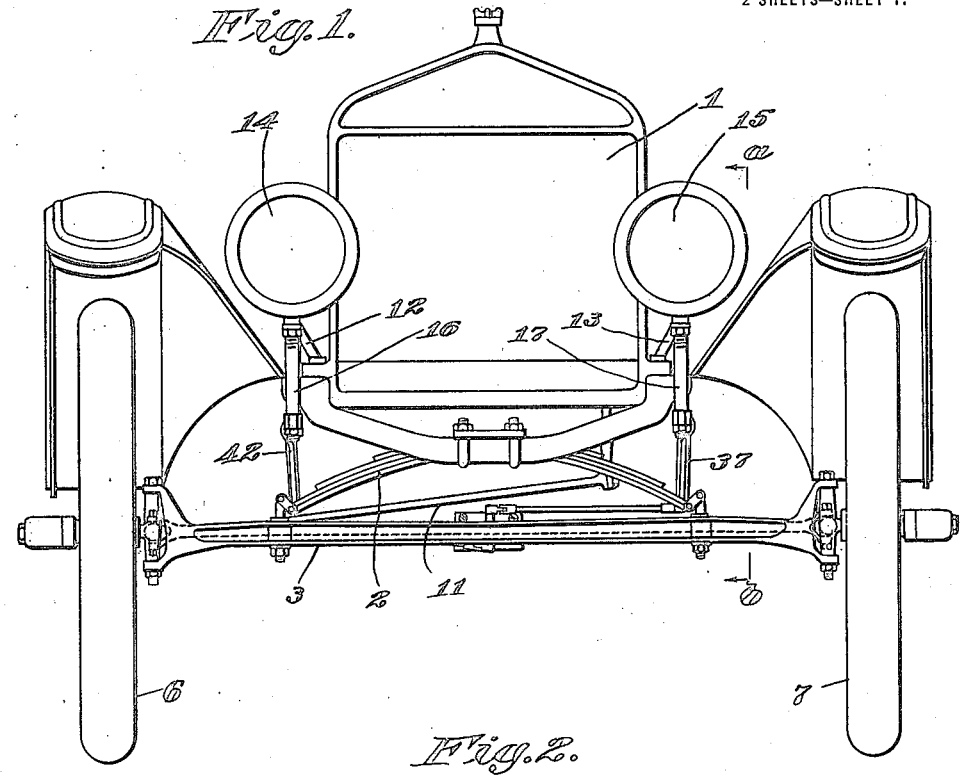
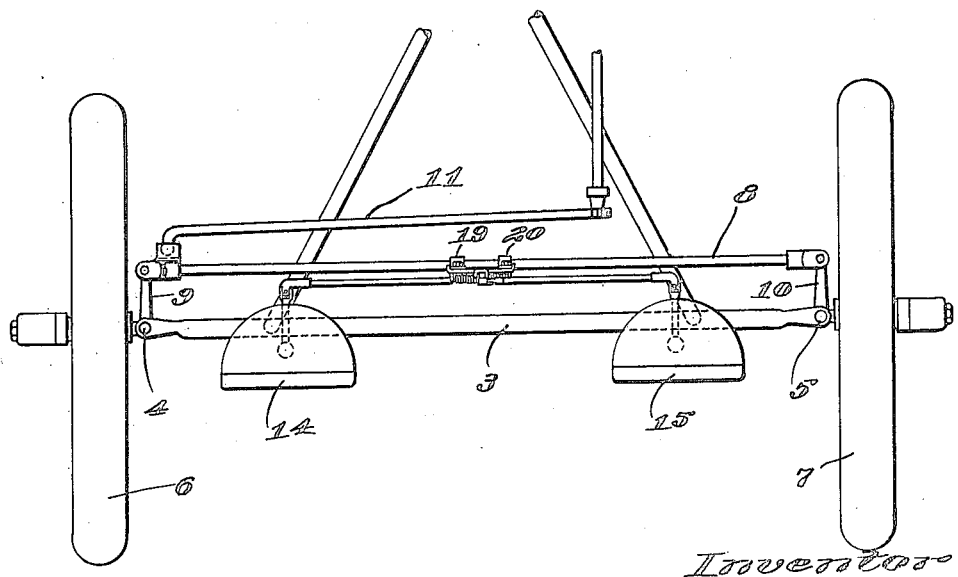
Inventor
Charles A. Litchfield
By Roberts, Roberts & Cushman
his Attorneys C. A. LITCHFIELD.
HEADLIGHT MECHANISM FOR VEHICLES.
APPLICATION FILED AUG. 9, 1921.
1,434,218.
Patented Oct. 31, 1922.
2 SHEETS—SHEET 2.
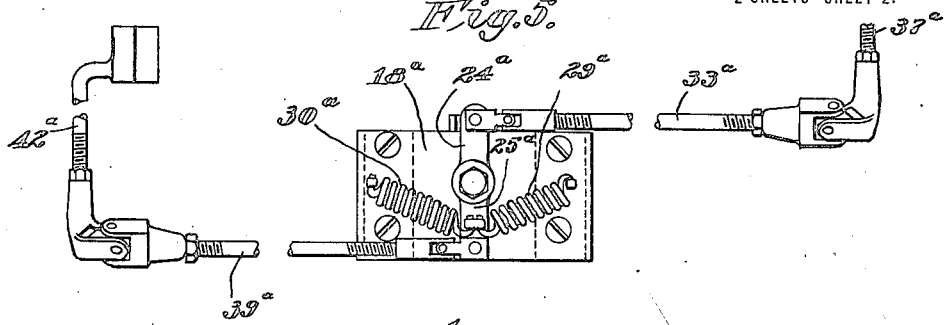
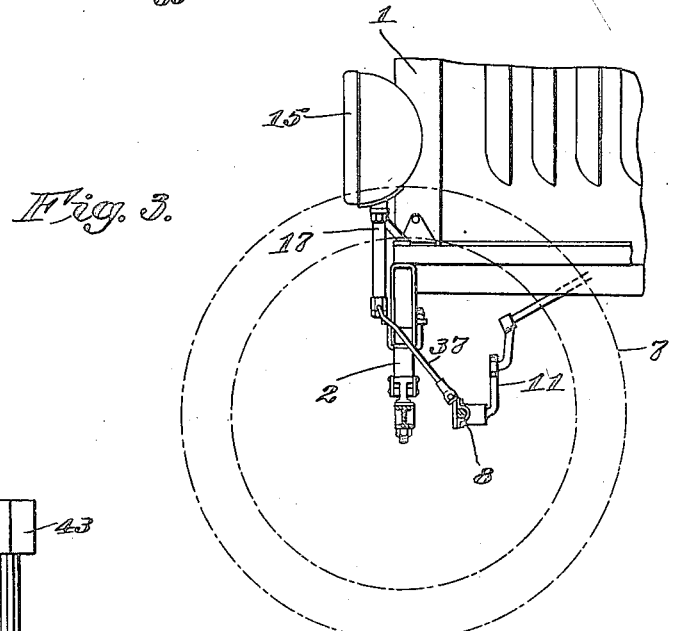
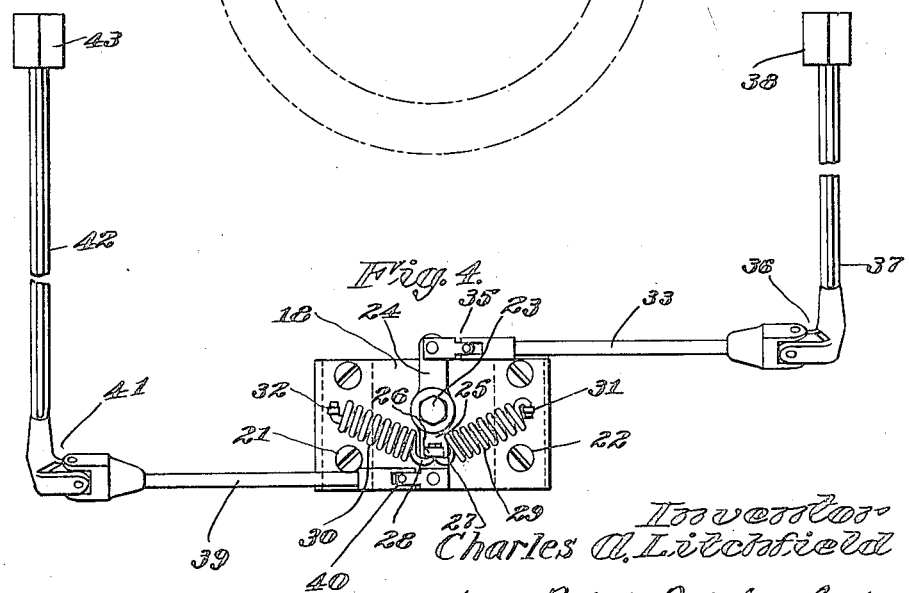

Patented Oct. 31, 1922.

1,434,218

UNITED STATES PATENT OFFICE.

CHARLES A. LITCHFIELD, OF QUINCY, MASSACHUSETTS.

HEADLIGHT MECHANISM FOR VEHICLES.

Application filed August 9, 1921. Serial No. 490,831.

*To all whom it may concern:*

Be it known that I, CHARLES A. LITCHFIELD, a citizen of the United States of America, and resident of Quincy, in the county of Norfolk and State of Massachusetts, have invented new and useful Improvements in Headlight Mechanism for Vehicles, of which the following is a specification.

This invention concerns headlights for vehicles and relates more particularly to means whereby the headlights may be caused to swing simultaneously with the turning of the forward axle or axles in the steering of the vehicle.

The pricipal object of the present invention is to provide mechanism of a simple and inexpensive form which can be applied to existing motor vehicles and lamps without substantial change therein and with a minimum expenditure of time and labor, and which at the same time will serve effectively to connect the wheel axles and lamps for simultaneous movement.

As the wheel-supporting axle vibrates to a considerable extent, particularly when the wheel is passing over a rough road, the lamps would partake of such vibration if positively connected to such wheel axle. This vibration of the lamp, with consequent rapid deflection of its beam of light is confusing both to the driver of the vehicle having such a lamp and also to the drivers of approaching vehicles, and is thus highly objectionable. A further object of the invention is to devise a lamp turning mechanism which will be effective for the purpose intended but which will avoid the transmission of relatively short and quick movements of the wheel axle to the lamp.

In the accompanying drawings there is illustrated by way of example, one embodiment of means suitable for carrying the above objects into effect and in such drawings:

Fig. 1 is a front elevation of a motor vehicle of usual construction showing the present invention as applied thereto;

Fig. 2 is a fragmentary plan view showing the forward part of the vehicle of Fig. 1 with the vehicle body removed;

Fig. 3 is a fragmentary, vertical cross section on a line such as *a, b*, of Fig. 1;

Fig. 4 is a front elevation to large scale showing the mechanism of the present invention as removed from the vehicle; and Fig. 5 is a view similar to Fig. 4 but illustrating a slight modification of the mechanism shown therein.

The vehicle body is indicated at 1, such body being supported by means of springs such as 2 upon the forward fixed axle 3. The axle 3 is forked at its opposite ends to provide bearings for the usual spindles 4, 5 upon which the steering axles of the forward wheels 6, 7 are supported. A transversely movable steering bar 8 of usual construction is indicated as mounted behind the axle 3, such bar being connected at its opposite ends to crank arms such as 9 and 10 projecting rearwardly from the spindles 4 and 5 respectively. At 11 is indicated an actuating connection of usual construction whereby transverse movement is imparted to the bar 8 in swinging the forward wheels for steering the vehicle. Secured at either side of the body 1 are lamp supporting brackets 12, 13, respectively upon which are mounted the headlight lamps 14, 15. The brackets 12, 13 provide vertically disposed journal openings, in which the stems 16, 17 depending respectively from the lamps 14, 15 are journaled. The above described parts may all be of substantially usual and known construction.

In accordance with the present invention, a supporting plate 18 is provided, such plate having associated therewith a pair of clamp members 19, 20 which are arranged to take over the steering bar 8. Such clamp members are secured to the rear side of the plate 18 by means of screws or bolts 21, 22, respectively. The plate 18 may thus be secured to the steering bar of a motor vehicle of usual construction without requiring any change in such bar. The plate 18 is preferably located substantially centrally of the steering bar. Projecting from the forward surface of the plate 18 is a pivot pin or bolt 23 which serves pivotally to support a lever comprising the upper and lower arms 24, 25, respectively. Projecting from the lower arm 25 is a lug 26 having an opening for the reception of the ends 27, 28 of a pair of tension springs 29, 30, respectively. The opposite ends of said springs are secured to lugs 31, 32, projecting from the forward face of the plate 18. These springs, as thus arranged, tend to maintain the lever comprising the arms 24, 25 in substantially vertical position. A link member 33 is connected to the upper end of the lever arm 24 by means of a universal joint connection 35, the opposite end of such link being secured by means of a universal joint connection at 36 to the lower end of a crank arm 37. This crank arm extends upwardly and forwardly and is provided at its free extremity with an angular socket 38 for the reception of a lower end of the lamp stem 17 which may be suitably shaped to seat snugly within such socket. The lamp stem may be secured in such socket in any desired manner whereby to prevent accidental separation of the parts and whereby movement of the crank arm 37 may serve to impart movement of rotation of the lamp stem in its supporting bracket. While it is preferred to form the socket 38 with a squared or angular opening, it is evident that it might, if desired, be provided with a bore of circular cross section within which the stem of the lamp might be secured by means of a set screw or in other suitable manner.

To the lower end of the lever arm 25 a second link 39 is connected by means of a universal joint connection at 40, the opposite end of said link being connected by means of a universal joint 41 to a crank arm 42 having a socket 43 for the reception of the lower end of the other lamp stem 16.

In accordance with the arrangement illustrated in Fig. 5, the plate 18$^a$ has mounted thereon a lever comprising the arms 24$^a$ centrally positioned by means of springs 29$^a$, 30$^a$, all as in the previous arrangement. In this modified form, however, the link members 33$^a$, 39$^a$ are formed as rods, having screw threaded engagement with the adjacent elements of their universal connections, instead of being integral therewith as in the previously described form. This arrangement permits of adjusting the lengths of links 33$^a$, 39$^a$ for purposes of initially setting the parts. In this arangement also the crank arms 37$^a$ and 42$^a$, respectively, have threaded connection with the adjacent elements of their respective universal joints whereby the effective lengths of such crank arms may be varied in order to permit of adjusting the length of such crank arms to secure the desired degree of turning movement of the lamp stems.

Either of the arrangements previously described is readily applicable to a vehicle of usual construction, it being simply necessary to clamp the supporting plate 18, 18$^a$ as the case may be, to the steering bar and to connect the lower ends of the lamp stems to the respective sockets 38 and 42.

While the above apparatus is suitable for employment with vehicles of usual types and having lamps of usual construction, it is evident that but slight and immaterial changes would be necessary in such apparatus in order to adapt the same for use with vehicles having slightly different arrangement of steering mechanism and having lamps supported in other ways. When the structure has been properly applied to a vehicle, any substantial lateral movement of the steering bar and such as would be imparted thereto for steering the vehicle, causes a corresponding movement of plate 18 and therewith of the links 33 and 39, thus swinging the lamps to the desired angle in order to keep the beams of light emitted therefrom substantially parallel with the planes of the respective wheels. If, however, the steering axles are caused to vibrate rapidly by reason of the passage of the wheels over a rough road, the corresponding movement of the supporting plate 18 is not transmitted in any substantial degree to the lamps, by reason of the fact that such lamps, due to the effects of inertia, tend to resist such movement, while the resilient connections afforded by the springs 29, 30 permit the plate to move slightly without necessarily imparting movement to the lamps.

Having thus described the invention in a preferred embodiment of the same, together with the mode of use thereof, what I claim and desire to secure by Letters Patent of the United States is:

1. A headlight mechanism comprising a substantially flat plate, means for clamping said plate in a vertical position against the steering bar of a motor vehicle, a pivot member projecting horizontally from the plate, a lever mounted to turn about the axis of said pivot member, a link having one end connected to said lever, and means for securing the other end of said link to a lamp-supporting member.

2. A headlight mechanism comprising a member constructed and arranged for attachment to the steering bar of a vehicle, a centrally pivoted lever mounted upon said member, and lamp actuating devices connected to each end of said lever.

3. A headlight mechanism comprising a pivoted lever bodily movable with the steering bar, lamp actuating devices connected to said member, and means tending to maintain said member in a predetermined angular position relatively to said bar.

4. A headlight mechanism comprising a member arranged for attachment to the steering bar of a motor vehicle, a centrally pivoted lever mounted upon said member, a pair of oppositely extending springs engaging said lever adjacent to one extremity thereof, and lamp actuating devices connected to the opposite extremity of the lever.

5. A headlight mechanism comprising a plate, a clamp for attaching said plate to the steering bar of a motor vehicle, a lever pivoted upon said plate, a pair of oppositely extending tension springs having their adjacent ends secured to one arm of the lever and having their remote ends secured to the plate, and a lamp actuating device comprising a universal joint having one of its elements secured to the other arm of said lever.

6. A headlight mechanism comprising a plate, clamp means for securing said plate to the steering bar of a motor vehicle, a lever pivoted to said plate, resilient means normally operative to maintain said lever in predetermined position, and lamp actuating devices connected to said lever.

Signed by me at Boston, Massachusetts, this 3rd day of August 1921.

CHARLES A. LITCHFIELD.